United States Patent
Wilt et al.

(10) Patent No.: US 9,542,192 B1
(45) Date of Patent: Jan. 10, 2017

(54) TOKENIZED STREAMS FOR CONCURRENT EXECUTION BETWEEN ASYMMETRIC MULTIPROCESSORS

(75) Inventors: Nicholas Patrick Wilt, Rochester, NY (US); Ian Buck, San Jose, CA (US); Philip Cuadra, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1625 days.

(21) Appl. No.: 12/192,912

(22) Filed: Aug. 15, 2008

(51) Int. Cl.
*G06F 9/46* (2006.01)
*G06F 9/38* (2006.01)
*G06F 9/52* (2006.01)
*G06F 9/30* (2006.01)

(52) U.S. Cl.
CPC ........... *G06F 9/3851* (2013.01); *G06F 9/3885* (2013.01); *G06F 9/526* (2013.01); *G06F 9/30087* (2013.01); *G06F 2209/521* (2013.01)
USPC ...................................................... 718/101

(58) Field of Classification Search
CPC .... G06F 9/3851; G06F 9/526; G06F 9/30087; G06F 2209/521
USPC ............................ 718/101; 717/143; 719/323
See application file for complete search history.

(56) References Cited

U.S. PATENT DOCUMENTS

| | | | | |
|---|---|---|---|---|
| 5,398,321 A * | 3/1995 | Jeremiah | ............... | G06F 9/3814 712/216 |
| 5,913,049 A * | 6/1999 | Shiell | .................... | G06F 9/3012 712/215 |
| 6,119,115 A * | 9/2000 | Barr | ......................... | G06F 9/526 |
| 6,515,661 B1 * | 2/2003 | Dawson | ....................... | 345/422 |
| 7,117,481 B1 * | 10/2006 | Agesen | .................... | G06F 9/526 717/120 |
| 7,234,144 B2 * | 6/2007 | Wilt et al. | ..................... | 718/104 |
| 7,383,412 B1 * | 6/2008 | Diard | ........................ | G06F 9/52 711/170 |
| 7,400,326 B1 * | 7/2008 | Acocella | ............. | G06F 13/4018 345/520 |
| 7,545,380 B1 * | 6/2009 | Diard | ..................... | G09G 5/363 345/440 |

(Continued)

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Eggers, et al., "Simultaneous Multithreading: A Platform for Next-Generation Processors," *IEEE Micro*, vol. 17, No. 5, pp. 12-19, Sep./Oct. 1997.

(Continued)

*Primary Examiner* — Benjamin Wu
(74) *Attorney, Agent, or Firm* — Artegis Law Group, LLP (57) ABSTRACT

A method for executing an application program using streams. A device driver receives a first command within an application program and parses the first command to identify a first stream token that is associated with a first stream. The device driver checks a memory location associated with the first stream for a first semaphore, and determines whether the first semaphore has been released. Once the first semaphore has been released, a second command within the application program is executed. Advantageously, embodiments of the invention provide a technique for developers to take advantage of the parallel execution capabilities of a GPU.

14 Claims, 8 Drawing Sheets

(56) References Cited

U.S. PATENT DOCUMENTS

| | | | | |
|---|---|---|---|---|
| 7,697,007 B1* | 4/2010 | Duluk, Jr. | ............ | G06F 9/4843 |
| | | | | 345/502 |
| 7,958,332 B2* | 6/2011 | Stuttard | ............... | G06F 9/3001 |
| | | | | 345/501 |
| 7,978,197 B2* | 7/2011 | Boyd et al. | ................... | 345/522 |
| 2003/0009604 A1* | 1/2003 | Howard et al. | ............... | 709/327 |
| 2006/0053143 A1* | 3/2006 | Liu | ....................... | G06F 12/084 |
| 2006/0080467 A1* | 4/2006 | Gould et al. | .................. | 709/250 |
| 2006/0218556 A1* | 9/2006 | Nemirovsky | ......... | G06F 9/3851 |
| | | | | 718/104 |
| 2006/0270173 A1* | 11/2006 | Yoshihara et al. | ............ | 438/311 |
| 2006/0271717 A1* | 11/2006 | Koduri | ..................... | G06F 9/52 |
| | | | | 710/241 |
| 2007/0067592 A1* | 3/2007 | Jeter, Jr. | ................. | G06F 9/522 |
| | | | | 711/163 |
| 2007/0169042 A1* | 7/2007 | Janczewski | ............ | G06F 8/314 |
| | | | | 717/149 |
| 2007/0195099 A1* | 8/2007 | Diard | ........................ | G06T 1/20 |
| | | | | 345/501 |
| 2008/0059672 A1* | 3/2008 | Irish et al. | .................... | 710/116 |
| 2008/0126755 A1* | 5/2008 | Wu | ........................ | G06F 9/524 |
| | | | | 712/220 |

OTHER PUBLICATIONS

Moss, et al. "Toward Acceleration of RSA Using 3D Graphics Hardware," LNCS 4887, Dec. 2007, pp. 369-388.

* cited by examiner

TOKENIZED STREAMS FOR CONCURRENT EXECUTION BETWEEN ASYMMETRIC MULTIPROCESSORS

BACKGROUND OF THE INVENTION

Field of the Invention

The present invention generally relates to data processing, and more specifically, to streams for concurrent execution between asymmetric multiprocessors.

Description of the Related Art

As is known, processing elements, including central processing units (CPUs) and graphics processing units (GPUs), may be configured to execute instructions in parallel. Instructions are usually generated by a compiler that translates (e.g., compiles) programming code written by a developer into a series of instructions. However, many programming languages are "sequential languages," meaning that commands within the programming code are compiled into corresponding instructions that are executed sequentially based on the order of the commands provided in the programming code. Thus, there is generally no way for a developer to take advantage of the parallel nature of the GPU.

Accordingly, what is needed in the art is a system and method for exposing the parallel nature of processors to a developer.

SUMMARY OF THE INVENTION

Embodiments of the invention provide a method for executing an application program using streams. A device driver receives a first command within an application program and parses the first command to identify a first stream token that is associated with a first stream. The device driver checks a memory location associated with the first stream for a first semaphore, and determines whether the first semaphore has been released. Once the first semaphore has been released, a second command within the application program is executed.

Advantageously, embodiments of the invention provide a technique for developers to take advantage of the parallel execution capabilities of a GPU. Using streams, developers are able to create programming code that is executed in parallel when there are no dependencies between different sets of data. Using embodiments of the invention, the overall efficiency of processing data is greatly improved.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
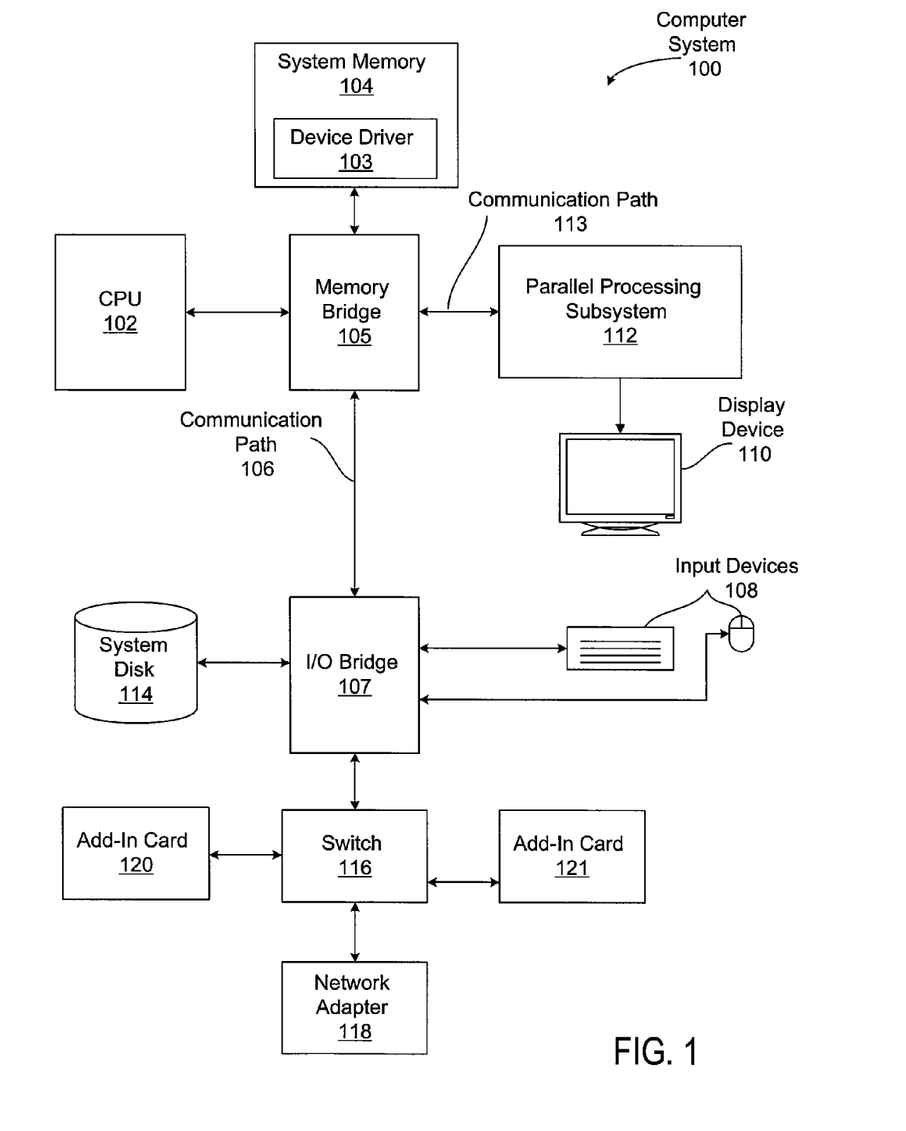
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
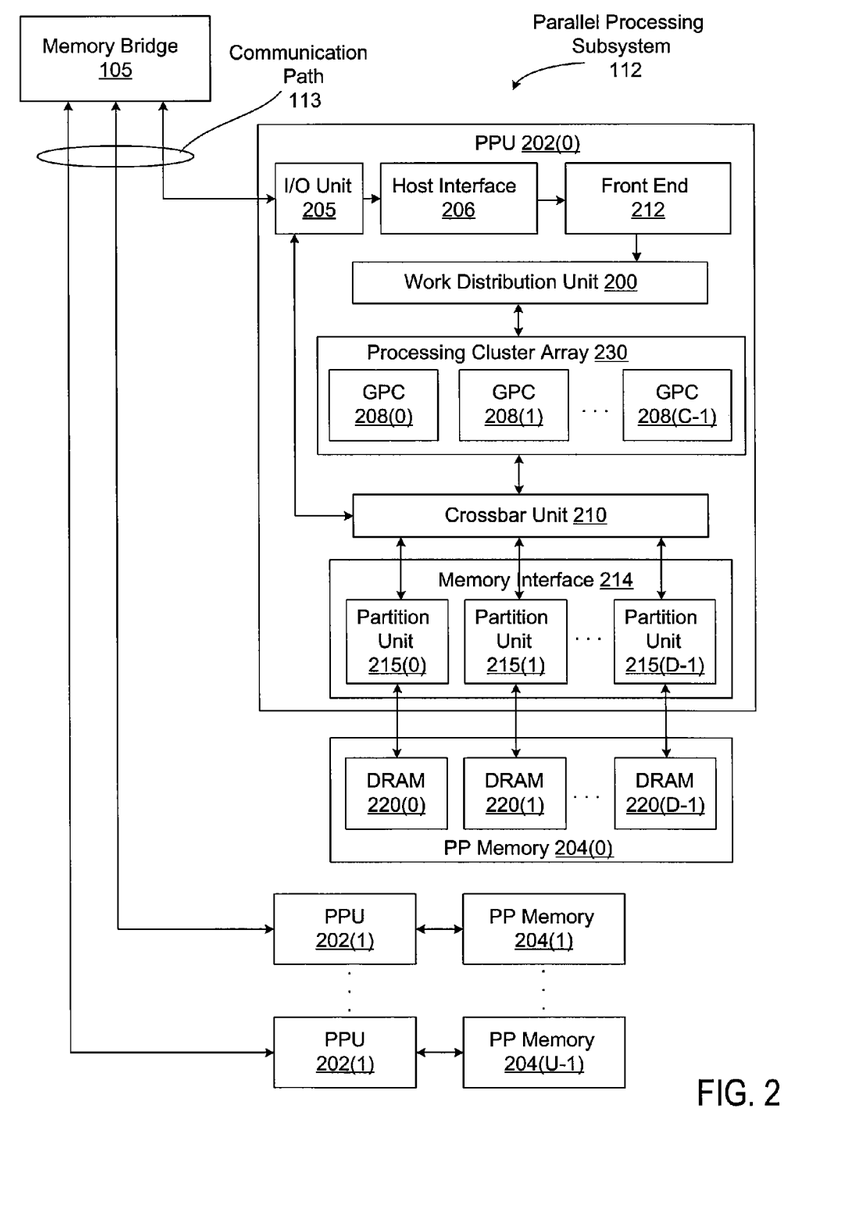
FIG. 2 illustrates a parallel processing subsystem, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212.

Front end 212 ensures that GPCs 208 are configured to a valid state before the processing specified by the pushbuffers is initiated.

A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
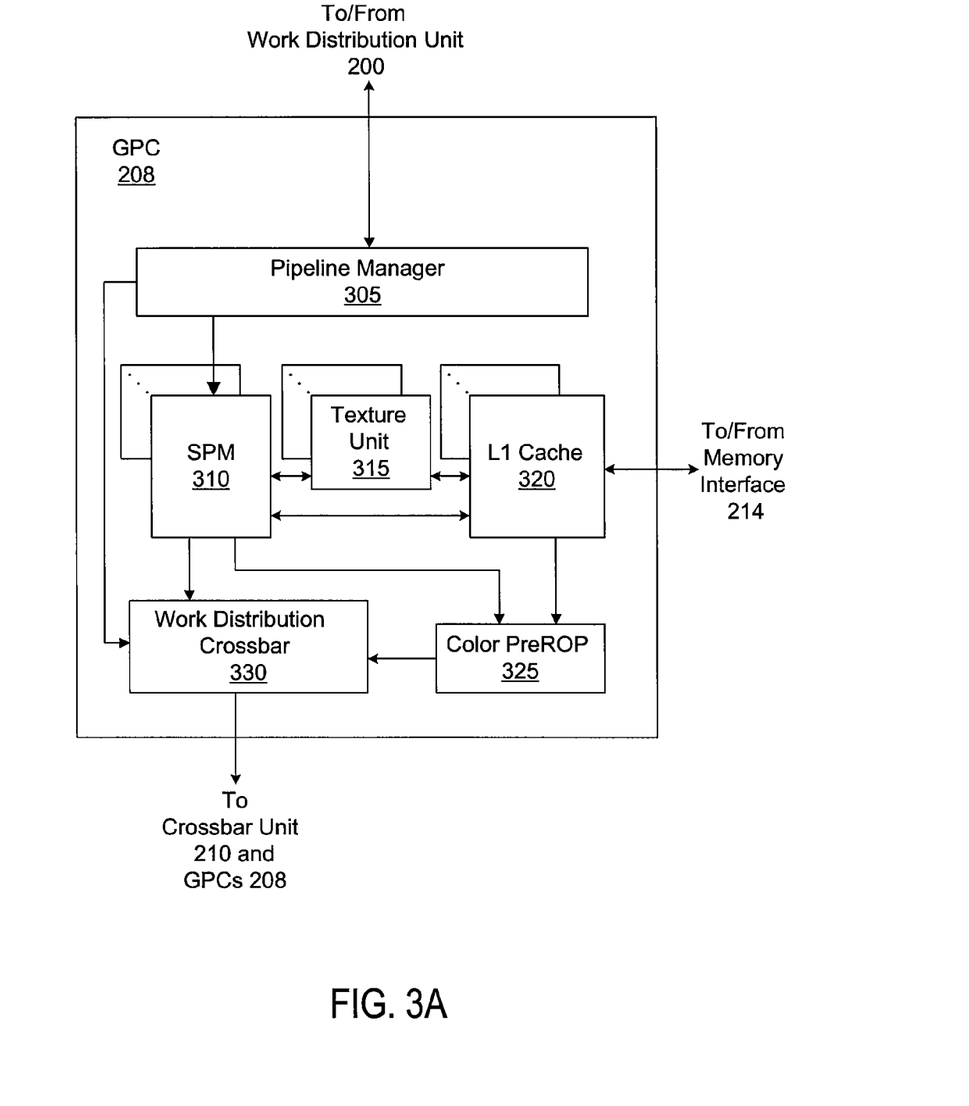
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In other embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to one or more SPMs 310. In one embodiment, each Shader-Primitive_Engine-Mpipe (SPM) 310 includes three modules: a shader module, primitive engine, and Mpipe Controller (MPC) (not shown).

In one embodiment, each GPC 208 includes a number M of SPMs 310, where M≥1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to GXM thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
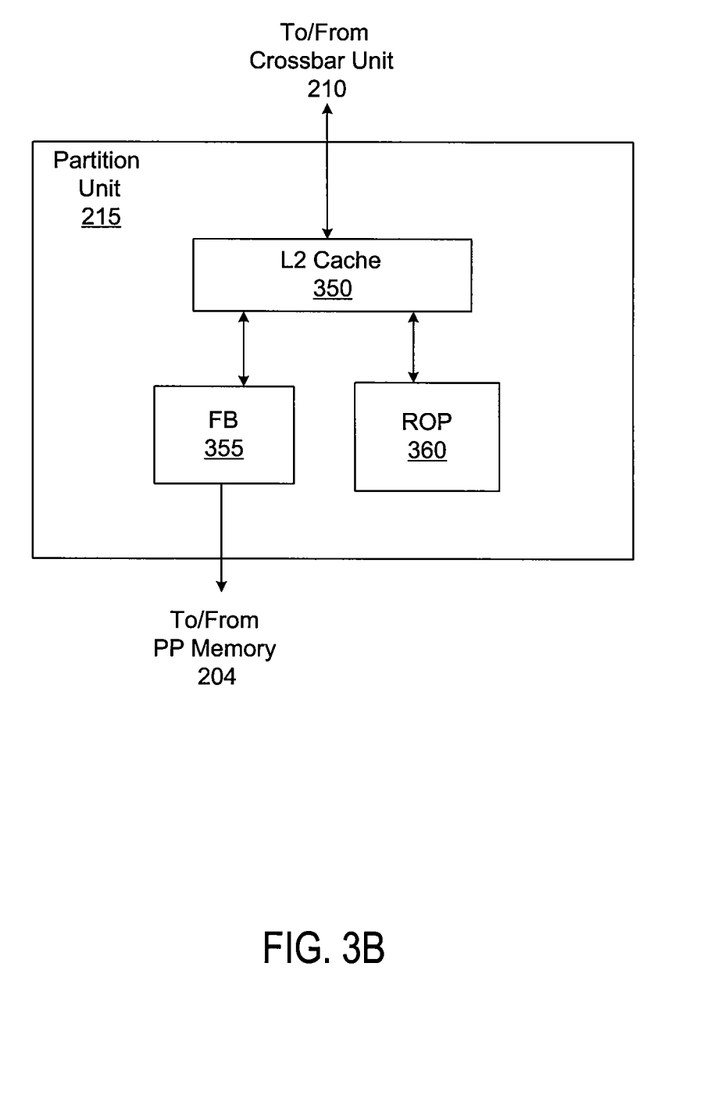
FIG. 3B is a block diagram of a partition unit within on of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. In some embodiments, L2 cache 350 may be split into four (or fewer) slices in order to interface with memory crossbar unit 210 at four times the bandwidth of FB 355. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

As described above, the parallel processing subsystem 112 may be configured to perform computations not related to graphics processing. For example, a developer may write programming code containing operations that are to be executed by the parallel processing subsystem 112. The operations are executed, by default, in sequential order since many programming languages are sequential languages. The parallel processing subsystem 112, however, is capable of executing instructions in parallel. Embodiments of the invention provide a technique to expose this parallelism in an application programming interface (API).

Concurrent Execution of Streams

Embodiments of the present invention provide a software abstraction known as a "stream" that may be used to provide parallelism across execution of program commands. Streams enable applications to exploit parallelism between execution units that are not the same. In contrast, threads generally enable applications to exploit parallelism between execution units that are identical. Threads in Win32 and Linux are intended to run on symmetric multiprocessing (SMP) machines where each CPU and/or each CPU core has the exact same instruction set and has a uniform address space. Streams expose parallelism between compute cores (SMs) that process sub-routines and the copy engines that can concurrently perform copy operations between system memory and local memory of the GPU while sub-routines are processing.

For example, when a developer understands that a first series of commands has no dependencies with a second series of commands, then the developer may utilize the stream abstraction to direct the GPU to process the first series of commands in parallel with the second series of commands. More specifically, a command in an application program may be designated by the developer to correspond to a particular stream by associating a stream token with the command. Various commands associated with different streams may then be compiled into one or more operations that are executed by the GPU. The operations that occur within the same stream occur sequentially, but operations that occur within different streams may occur in any order. In contrast, using conventional techniques, program commands are processed sequentially in the order that they appear in the program.

For example, a first series of commands may direct data to be copied from system memory 104 to local memory of a GPU. A second series of commands may then direct the GPU to execute various functions using the data to modify the data. A third series of commands may direct the modified data to be copied from the GPU local memory to the host memory 104. In one embodiment, a first copy engine may process the first series of commands, an SPM 310 may process the second series of commands, and a second copy engine may process the third series of commands. The first and second copy engines are separate from the SPM and can simultaneously perform data transfers while the SPM is processing the data. By associating each of the first series, the second series, and the third series of commands with different streams, a developer is able to take advantage of the parallel architecture of the GPU.

Additionally, when computationally expensive tasks are involved, executing a single command may take a significant amount of time. For example, a financial analysis program may include three commands. A first command may copy stock data associated with each stock listed on a stock exchange from the system memory 104 to the GPU local memory. A second command may process the stock data to modify the stock data. A third command may copy the modified data from the GPU local memory to the system memory 104. With conventional approaches, the entire stock data would be copied to the GPU local memory in one large copy operation, then the second command would be executed by the GPU to modify the stock data, and finally the entire set of modified data would be copied to the system memory 104. For example, each of these 3 operations may be very computationally expensive because of the large amount of data involved.

In contrast, alternative embodiments of the invention allow for "sub-streams" to be utilized to further break up computationally expensive tasks into several portions when there are no dependencies among those portions. Continuing with the stock analysis example, there may be no dependencies between individual stocks in the context of executing the second command. In such a situation, further parallelism may be achieved by breaking apart the stock data and associating each portion with a different sub-stream. In this fashion, copy operations corresponding to a first portion of the stock data may be performed in parallel with execution operations corresponding to a second portion of the total stock data and copy operations corresponding to a third portion of the stock data. Implementing sub-streams "hides" the costs associated with downloading a large amount of data to the GPU local memory because the copy operations are performed in parallel with operations that modify the data.

Using streams or sub-streams is advantageous because additional data parallelism may be achieved. Commands within an application programs that would normally be executed serially may be performed in parallel to decrease the amount of time needed to finish executing the application program. In one embodiment, highly efficient stream processing may be achieved by implementing approximately eight to twelve concurrent streams or sub-streams. Additionally, streams, unlike threads, may be implemented across non-uniform hardware architectures, thereby providing more flexibility than threads.

Figure 4:
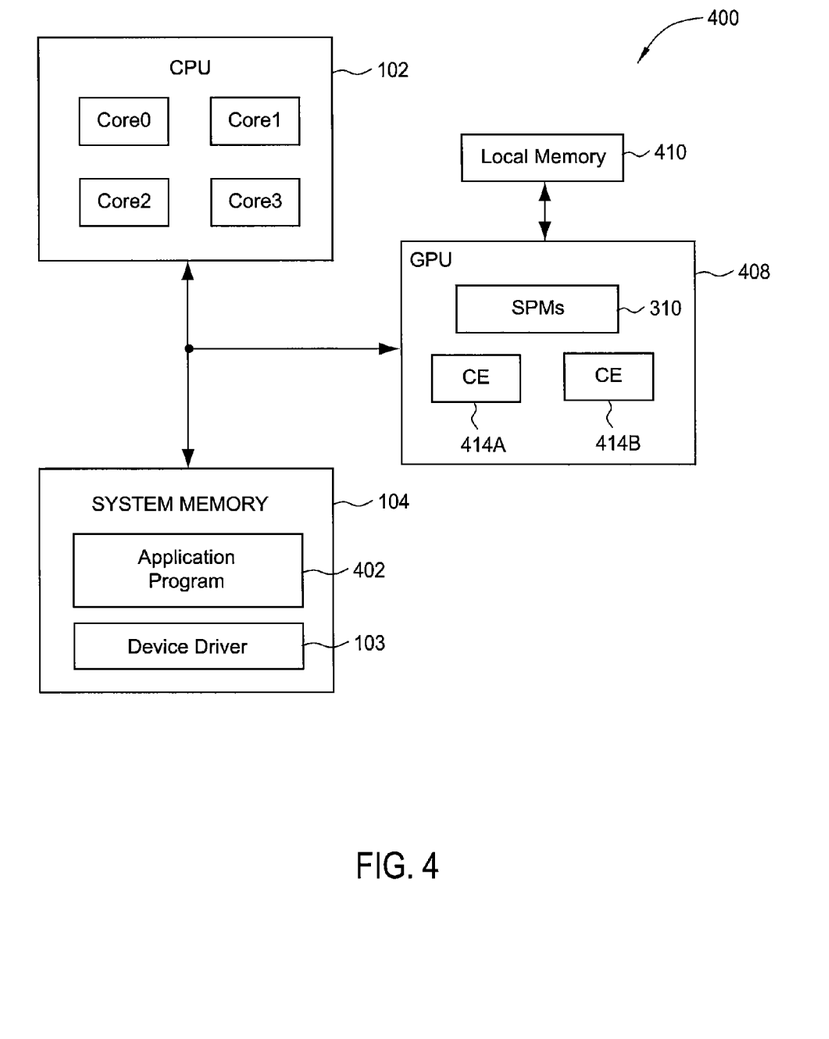
FIG. 4 is a block diagram illustrating a computer system configured to concurrently execute commands of an application program across multiple streams, according to one embodiment of the invention.

FIG. 4 is a block diagram illustrating a computer system 400 configured to concurrently execute commands of an application program 402 across multiple streams, according to one embodiment of the invention. As shown, computer system 400 includes a CPU 102, a system memory 104, a GPU 408, and GPU local memory 410. In one embodiment, the CPU 102 may be configured with multiple processing cores. The application program 402 may be stored in the system memory 104 and may be executed by the CPU 102 via the device driver 103. As described above, the application program 402 may include commands that are designated to be offloaded to and executed by the GPU 408.

The GPU 408 includes one or more SPMs 310 and copy engines 414A, 414B. The GPU 408 may be configured to access the GPU local memory 410 when executing instructions. The copy engines 414A, 414B may be configured to perform copy operations between the local memory 410 and the system memory 104. In one embodiment, a first copy engine 414A is configured to perform copy operations from the system memory 104 to the local memory 410; whereas, a second copy engine 414B is configured to perform copy operations from the local memory 410 to the System memory 104. In alternative embodiments, the copy engines 414A, 414B are bi-directional and may copy data both from the system memory 104 to the local memory 410, and from the local memory 410 to the system memory 104.

Figure 5:
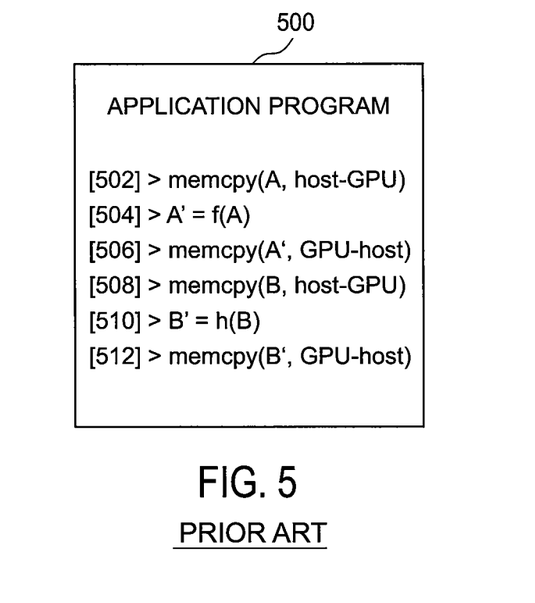
FIG. 5 sets forth pseudo-code representing an application program, according to the prior art.

FIG. 5 sets forth pseudo-code representing an application program 500, according to the prior art. As shown, the application program includes commands 502-512. Command 502 represents a copy operation of data A from system memory 104 to local memory 410 accessible by the GPU 408. In one embodiment, command 502 is executed by copy engine 414A. Command 504 takes data A as input and performs function f(A) to generate data A'. In one embodiment, command 504 is executed by one of the SPMs 310 of the GPU 408. Command 506 represents a copy operation of data A' from local memory 410 to system memory 104. In one embodiment, command 506 is executed by copy engine 414B. Commands 508-512 involving data B, data B', and function h(B) represent similar commands to those of commands 502-506 involving data A, data A', and function f(A). There are no dependencies between commands 502-506 and 508-512, respectively. As described above, the copy operations may be performed by copy engines 414A and 414B; whereas, the execution of commands f(A) and g(B) may be performed by SPMs 310. Application program 500 may be programmed in the C++ programming language, which is a sequential language, or any other technically feasible programming language. Using conventional techniques, each of commands 502-512 is processed serially.

Figure 6:
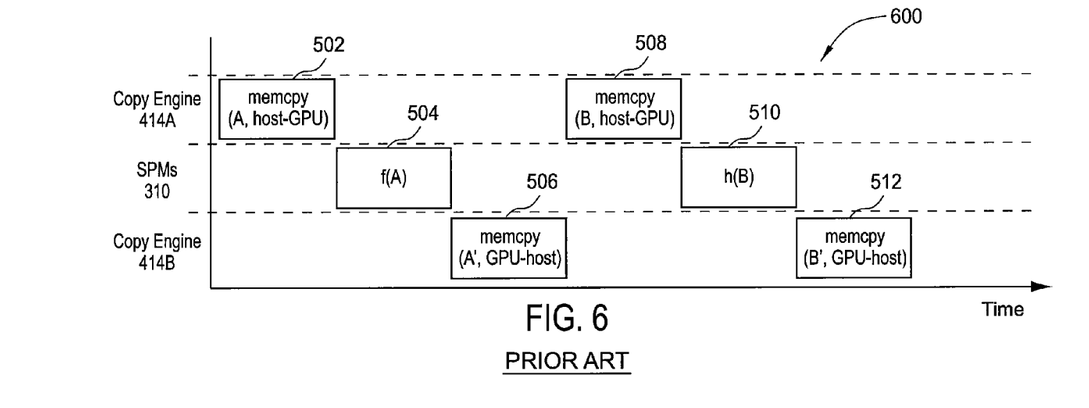
FIG. 6 is a timing diagram illustrating when various commands are performed upon executing the application program of FIG. 5, according to the prior art.

FIG. 6 is a timing diagram 600 illustrating when various commands are performed upon executing the application program 500 of FIG. 5, according to the prior art. As shown, commands 502 and 508 are performed by the copy engine 414A, commands 504 and 510 are performed by the SPMs 310, and commands 506 and 512 are performed by the copy engine 414B. In one embodiment, execution of command 504 does not begin until execution of command 502 is complete, and execution of command 506 does not begin until execution of command 504 is complete. This is because there is a dependency between commands 502-504 and commands 504-506, respectively. Importantly, execution of command 508 does not begin until execution of command 506 is complete. However, as described above, there is no dependency between commands 508-512 and commands 502-506. As shown, conventional techniques similar to those described in FIG. 6 provide no parallelism in the execution of commands 502-512 even though there are no dependencies between the set of commands involving data A (command 502-506) and the set of commands involving data B (commands 508-512). Failing to capitalize on the parallel nature of the GPU using such conventional techniques can cause unnecessary inefficiencies, thereby hindering overall system performance.

Figure 7:
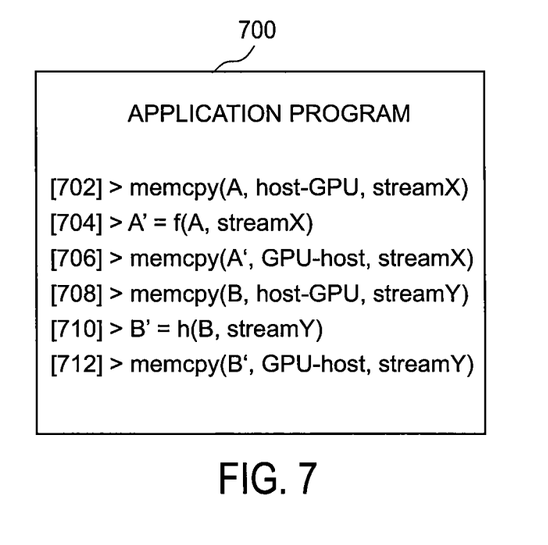
FIG. 7 sets forth pseudo-code representing an application program, according to one embodiment of the invention.

FIG. 7 sets forth pseudo-code representing an application program 700, according to one embodiment of the invention. As shown, the application program 700 includes commands 702-712. In one embodiment, command 704 has a dependency on command 702, and command 706 has a dependency on command 704. Similarly, command 710 has a dependency on command 708, and command 712 has a dependency on command 710. However, there are no dependencies between any of commands 702-706 and commands 708-712. The developer may associate commands 702-706 with stream X, and may associate commands 708-712 with stream Y. As shown, each of commands 702-712 includes a stream token as an input corresponding to either stream X or stream Y.

Figure 8:
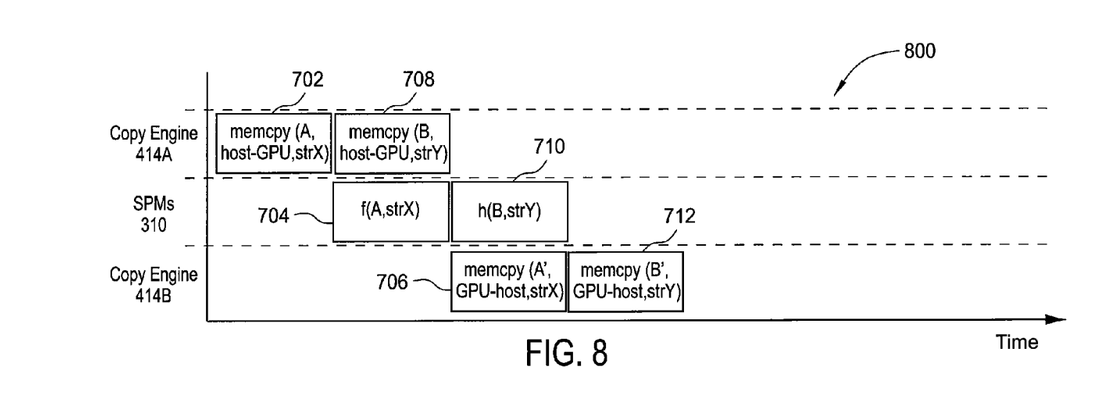
FIG. 8 is a timing diagram illustrating when various commands are performed upon executing the application program of FIG. 7, according to one embodiment of the invention.

FIG. 8 is a timing diagram illustrating when various commands are performed upon executing the application program 700 of FIG. 7, according to one embodiment of the invention. As described above, because dependencies exist between commands 702-706 associated with stream X, these commands are executed serially. However, there are no dependencies between the commands associated with stream Y (commands 708-712) and the commands associated with stream X (702-706). As shown, commands 708 and 704 are performed in parallel. Similarly, commands 710 and 706 are also performed in parallel. As described above, the copy engines 414A, 414B that perform the copy operations between system memory 104 and local memory 410 may execute simultaneously with the SPMs 310, allowing for operations to be performed in parallel. Because stream tokens corresponding to stream X and stream Y are included in the commands 702-712, the device driver 103 is able to determine which operations may be executed in parallel and may instruct the copy engines 414A, 414B and the SPMs 310 to execute commands in parallel when no dependencies exist between the commands.

In one embodiment, dependencies between streams may be resolved using semaphores. A first channel may include a buffer of pending operations to be executed by the SPMs 310. A second channel may include a buffer of pending operations to be executed by a first copy engine 414A. Additional channels may include buffers of pending operations to be executed by additional copy engines (e.g., copy engine 414B). A semaphore may be acquired from a memory location when a particular stream is being executed and the semaphore may be released when execution of the stream is complete. In this fashion, the device driver 103 is able to determine whether a stream is in the process of executing operations or whether execution of all operations associated with a stream is complete by querying a memory location associated with the stream for an acquired or released semaphore.

Advantageously, embodiments of the invention provide a technique for developers to take advantage of the parallel execution capabilities of a GPU. Comparing the timing diagrams of FIGS. 6 and 8, the total time to finish executing the operations is greatly decreased when utilizing techniques involving streams.

API Calls

Several API mechanisms are provided to aid developers when using streams in application programs. A first API call is designated as cuStreamQuery([stream]). cuStreamQuery( ) takes a stream as an input and returns a value indicating whether each operation associated with the stream has finished executing. A developer may use this API call to poll the GPU to determine if a particular stream has finished executing. In one embodiment, to determine whether a stream has finished executing, cuStreamQuery( ) may query a memory location associated with the semaphore associated with the stream. If the semaphore is acquired, then the stream is not finished executing. If the semaphore has been released, then the stream is finished executing. For example, cuStreamQuery( ) may be used for applications that are exploiting CPU/GPU concurrency. There may be tasks designated for execution by the CPU other than the task of submitting work to the GPU and receiving results back. Such applications may want to "check in" with the GPU to see if the GPU is done with the work for a given stream. The CPU may want to submit more commands for the stream, process results that are now available, or both. If processing the stream by the GPU is not complete, then the application can perform other tasks, e.g., manage network traffic.

A second API call is designated as cuStreamSynchronize ([stream]). cuStreamSynchronize( ) takes a stream as an input, and blocks execution of subsequent commands in the application program until the stream has finished executing. No subsequent API calls are processed until the specified stream is finished executing. cuStreamSynchronize( ) functions as a blocking mechanism that halts execution of all subsequent commands in the application program until the input stream has finished executing. In one embodiment, cuStreamSynchronize( ) may determine whether a particular stream has finished executing using semaphores, as described above. cuStreamSynchronize( ) is implementable in terms of cuStreamQuery( ). For example, applications that might otherwise find themselves busy-waiting on cuStreamQuery( ) because they do not have anything else for the CPU to do. The driver can perform this synchronization more efficiently.

A third API call is designated as cuStreamWaitStream ([streamA], [streamB]). cuStreamWaitStream( ) takes two streams as inputs, streamA and streamB. cuStreamWaitStream( ) instructs streamA to wait until all operations associated with streamB have finished executing before operations associated with streamA can begin executing. cuStreamWaitStream( ) may be used when there are dependencies between streamA and streamB. Other subsequent commands in the application program that do not depend on streamB, however, may continue to be executed. In one embodiment, cuStreamWaitStream( ) may determine whether a particular stream has finished executing using semaphores, as described above. The functionality of cuStreamWaitStream( ) is different from the functionality of cuStreamSynchronize( ) because, when using cuStreamWaitStream( ), only those commands that have a dependency on streamB are halted. In contrast, cuStreamSynchronize( ) is a global halt operator that halts all subsequent commands from being executed until the particular stream is finished executing. cuStreamWaitStream( ) may be useful for applications where some operations may be performed concurrently, but others cannot, so synchronization must be performed on the GPU side. Referring to FIG. 7, if there were a computation C'=g(A',B',streamX) to be performed after command 712, then stream X associated with this computation would have to wait until commands 704 and 710 both have completed. If streamX is associated with this computation, then a call to cuStreamWaitStream( ) may be inserted into the set of operations to be performed by streamX so that the computation waits on streamY to finish executing. Since the computation is performed in streamX, the ordering within the stream guarantees that the dependencies are dealt with correctly. For example, the commands may include:

cuStreamWaitStream(streamX,streamY)//streamX waits for streamY

C'=g(A',B',streamX)

In alternative embodiments, a developer could use a third stream and call cuStreamWaitStream( ) twice, once for each of streamX and streamY.

Figure 9:
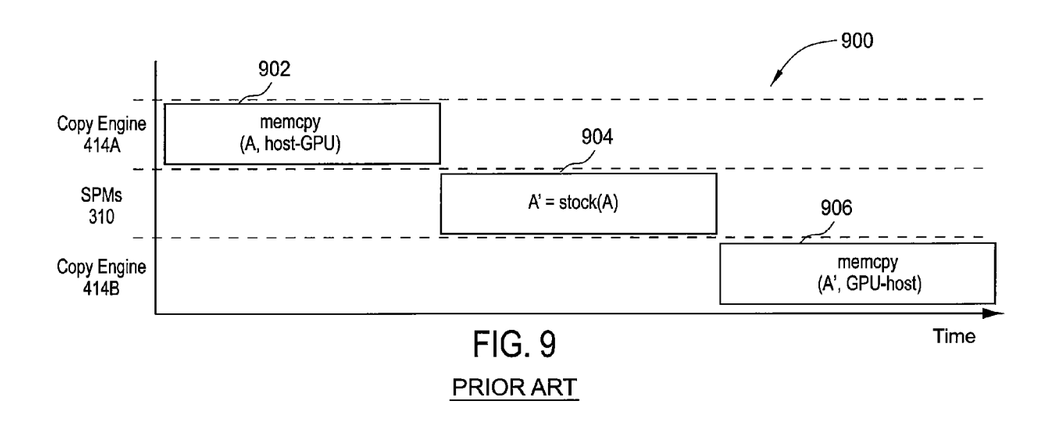
FIG. 9 is a timing diagram illustrating when various commands are performed upon executing an application program, according to the prior art.

FIG. 9 is a timing diagram 900 illustrating when various commands are performed upon executing an application program, according to the prior art. As described above, a stock analysis application program may be configured to perform an analysis operation using each stock listed on a stock market as input. The stock analysis application program may be designated to be executed by the GPU. As shown, command 902 represents a copy operation of data A from system memory 104 to GPU local memory 410. For example, data A may represent initial stock data. The data A may be a large amount of data, e.g., more than 1 GB. Command 904 represents the execution of the operation stock( ) using data A as input to generate data A'. Command 904 may be executed by one or more of the SPMs 310. Finally, data A' is copied from GPU local memory 410 to system memory 104 via command 906.

Figure 10:
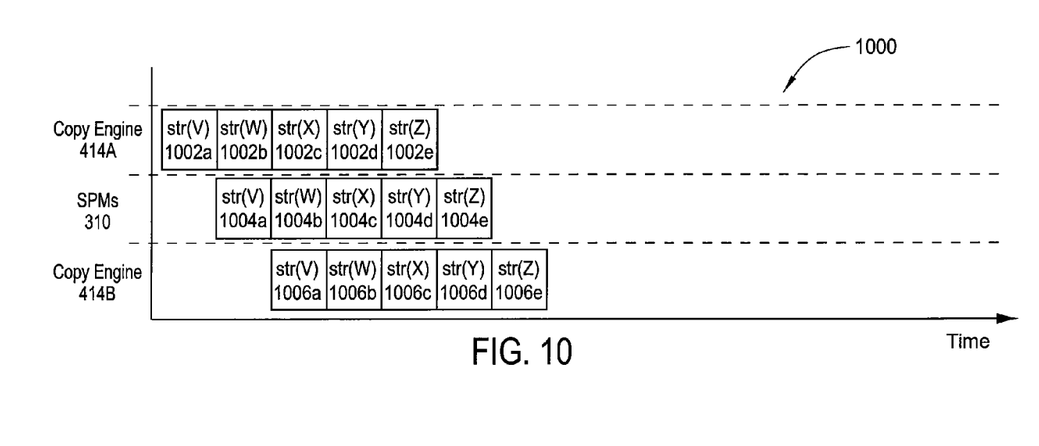
FIG. 10 is a timing diagram illustrating when various sub-commands are performed upon executing an application program, according to one embodiment of the invention.

As described above, alternative embodiments of the invention allow for "sub-streams" to be utilized to further break up computationally expensive commands into several sub-commands when there are no dependencies among those sub-commands. Continuing with the stock analysis example, there may be no dependencies between individual stocks in the context of executing the first command (copy data A to GPU), the second command (execute stock(A) to generate data A'), or the third command (copy data A' to system memory). Thus, each of the three command may be divided into sub-commands that operate on only a portion of the total data. Each sub-command may then be associated with a sub-stream. As shown in FIG. 10, FIG. 10 is a timing diagram 1000 illustrating when various sub-commands are performed upon executing an application program, according to one embodiment of the invention. Sub-commands 1002a-1002e correspond to command 902 of FIG. 9, sub-commands 1004a-1004e correspond to command 904 of FIG. 9, and sub-commands 1006a-1006e correspond to command 906 of FIG. 9. As shown, each command 902-906 is divided into five sub-commands and assigned to one of sub-streams V, W, X, Y, or Z. There are no dependencies between sub-streams, thus the device driver is able to schedule operations to be executed in parallel. In this fashion, copy operations corresponding to a first portion of the stock data (e.g., sub-command 1002c) may be performed in parallel with execution operations corresponding to a second portion of the total stock data (e.g., sub-command 1004b) and copy operations corresponding to a third portion of the stock data (e.g., sub-command 1006a). Implementing sub-streams "hides" the costs associated with downloading a large amount of data to the GPU local memory because the copy operations are performed in parallel with operations that modify the data. As a result, the total time to finish executing the application program is greatly decreased.

Advantageously, embodiments of the invention provide a technique for developers to create programming code that is executed in parallel when there are no dependencies between different sets of data to achiever better efficiency.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for executing application commands associated with a plurality of streams, the method comprising:
receiving from an application program a first command that is associated with a first stream token;
parsing, via a device driver, the first command to identify the first stream token, wherein the first stream token indicates to the device driver that commands associated with the first stream, including the first command, can be executed in parallel with commands associated with another stream across different execution units within a graphics processing unit;
querying a memory location associated with the first stream for a first semaphore;
determining that the first semaphore has not yet been released; and
until the first semaphore has been released, either blocking execution of each command in the application program subsequent to the first command until the graphics processing unit has finished executing all operations associated with the first stream, or waiting until all operations associated with the first stream have finished executing before executing any operations associated with a second stream.

2. The method of claim 1, further comprising:
receiving a second command from the application program, wherein the second command causes the device driver to determine whether the processing unit has finished executing each operation associated with the first stream; and
returning an indication to the application program whether the operations associated with the first stream have finished executing.

3. The method of claim 1, further comprising the steps of:
receiving a second command from the application program;
parsing, via the device driver, the second command to identify a second stream token indicating that the second command is associated with the second stream;
determining that the second stream has a dependency on the first stream; and
waiting until all operations associated with the first stream have finished executing before executing any operations associated with the second stream.

4. The method of claim 3, further comprising the steps of:
releasing the first semaphore when the processing unit has finished executing each operation associated with the first stream; and
acquiring a second semaphore associated with the second stream from a second memory location.

5. The method of claim 3, further comprising the steps of:
receiving a third command from the application program
parsing, via the device driver, the third command to identify a third stream token indicating that the third command is associated with a third stream;
determining that the third stream does not have a dependency on the first stream;
acquiring a third semaphore associated with the third stream; and
transmitting one or more operations associated with the third command to the graphics processing unit for execution.

6. The method of claim 5, wherein the first command and the third command are sub-commands that represent different portions of a fourth command.

7. A non-transitory computer-readable storage medium storing instructions that, when executed by a processor, cause the processor to execute application commands associated with a plurality of streams by performing the steps of:
receiving from an application program a first command that is associated with a first stream token;
parsing the first command to identify the first stream token, wherein the first stream token indicates to a device driver that commands associated with the first stream, including the first command, can be executed in parallel with commands associated with another stream across different execution units within a graphics processing unit
querying a memory location associated with the first stream for a first semaphore;
determining that the first semaphore has not yet been released; and
until the first semaphore has been released, either blocking execution of each command in the application program subsequent to the first command until the graphics processing unit has finished executing all operations associated with the first stream, or waiting until all operations associated with the first stream have finished executing before executing any operations associated with a second stream.

8. The non-transitory computer-readable storage medium of claim 7, the steps further comprising:
receiving a second command from the application program, wherein the second command causes the device driver to determine whether the processing unit has finished executing each operation associated with the first stream; and
returning an indication to the application program whether the operations associated with the first stream have finished executing.

9. The non-transitory computer-readable storage medium of claim 7, further comprising the steps of:
receiving a second command from the application program;
parsing the second command to identify a second stream token indicating that the second command is associated with the second stream;
determining that the second stream has a dependency on the first stream; and
waiting until all operations associated with the first stream have finished executing before executing any operations associated with a second.

10. The non-transitory computer-readable storage medium of claim 9, further comprising the steps of:
releasing the first semaphore when the processing unit has finished executing each operation associated with the first stream; and
acquiring a second semaphore associated with the second stream from a second memory location.

11. The non-transitory computer-readable storage medium of claim 9, further comprising the steps of:
receiving a third command from the application program
parsing the third command to identify a third stream token indicating that the third command is associated with a third stream;
determining that the third stream does not have a dependency on the first stream;
acquiring a third semaphore associated with the third stream; and
transmitting one or more operations associated with the third command to the graphics processing unit for execution.

12. The non-transitory computer-readable storage medium of claim 11, wherein the first command and the third command are sub-commands that represent different portions of a fourth command.

13. The non-transitory computer-readable storage medium of claim 7, wherein the graphics processing unit comprises a co-processor within a computing system that includes a central processing unit.

14. A computing system configured to execute application commands from an application program using a plurality of streams, comprising:
a graphics processing unit; and
a system memory coupled to the graphics processing unit and storing a device driver and the application program, wherein the device driver is configured to:
receive from an application program a first command that is associated with a first stream token;
parse the first command to identify the first stream token, wherein the first stream token indicates to the device driver that commands associated with the first stream, including the first command, can be executed in parallel with commands associated with another stream across different execution units within a graphics processing unit;

querying a memory location associated with the first stream for a first semaphore;

determine that the first semaphore has not yet been released; and until the first semaphore has been released, either block execution of each command in the application program subsequent to the first command until the graphics processing unit has finished executing all operations associated with the first stream, or wait until all operations associated with the first stream have finished executing before executing any operations associated with a second stream.

* * * * *